United States Patent [19]

Knöfel et al.

[11] Patent Number: 4,720,582
[45] Date of Patent: Jan. 19, 1988

[54] DIAMINES AND A PROCESS FOR THEIR PRODUCTION

[75] Inventors: Hartmut Knöfel, Odenthal-Erberich; Michael Brockelt, Bergisch-Gladbach; Stefan Penninger, Dormagen, all of Fed. Rep. of Germany

[73] Assignee: Bayer Aktiengesellschaft, Leverkusen, Fed. Rep. of Germany

[21] Appl. No.: 523,211

[22] Filed: Aug. 15, 1983

[30] Foreign Application Priority Data

Aug. 27, 1982 [DE] Fed. Rep. of Germany ........ 3231912

[51] Int. Cl.$^4$ ............................................. C07C 87/52
[52] U.S. Cl. .................... 564/305; 564/420; 564/422
[58] Field of Search .......... 564/305, 420, 422

[56] References Cited

U.S. PATENT DOCUMENTS 2,511,028  6/1950  Whitman ............................ 564/305
3,663,514  5/1972  Campbell et al. ................. 528/44
4,293,687  10/1981 Weissel et al. .................... 528/346

FOREIGN PATENT DOCUMENTS 1146957  5/1983  Canada ............................. 564/503
2359115  10/1981 France .............................. 564/503

OTHER PUBLICATIONS

March, *Advanced Organic Chemistry*, 2nd Ed., McGraw-Hill Co., New York, pp. 715–716 (1979).

Primary Examiner—Charles F. Warren
Assistant Examiner—John A. Sopp
Attorney, Agent, or Firm—Gene Harsh; Joseph C. Gil

[57] ABSTRACT

Diamines corresponding to the general formula

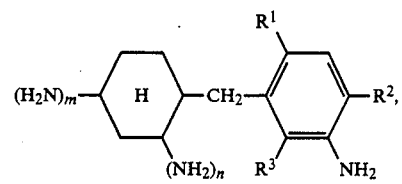

wherein
$R^1$, $R^2$ and $R^3$ may be identical or different and represent hydrogen or straight- or branched-chain $C_1$–$C_{12}$ alkyl groups, provided that two of the radicals, $R^1$, $R^2$ and $R^3$, represent hydrogen, m and n each represent 0 or 1, provided that $m+n=1$; where m or $n=0$, the free valence is saturated by hydrogen, optionally in the form of isomeric mixtures, and optionally containing up to 35%, by weight, of the corresponding perhydrogenated diamines, and up to 10%, by weight, of the corresponding unhydrogenated aromatic diamines.

Also, a process for preparing these diamines by catalytically-hydrogenating the corresponding aromatic diamines with 3 moles of hydrogen per mole of diamine, or catalytically-hydrogenating the corresponding dinitro compounds with 9 moles of hydrogen per mole of dinitro compound.

8 Claims, No Drawings

DIAMINES AND A PROCESS FOR THEIR PRODUCTION

This invention relates to new diprimary aminocyclohexyl methyl anilines, monosubstituted on the aromatic ring, which are optionally isomer mixtures and/or which may optionally be present in admixture with small quantities of the corresponding unhydrogenated or perhydrogenated diamines, and to a process for producing the new compounds by the catalytic partial hydrogenation of the aromatic diamines or dinitro compounds on which they are based.

BACKGROUND OF THE INVENTION

Aminocyclohexyl alkyl anilines which are either unsubstituted or substituted on both rings are already known from U.S. Pat. No. 2,511,028. They are suitable, for example, as intermediate products for the production of dyes, rubber auxiliaries, surface-active substances, polyamides, polyester polyamides or as corrosion inhibitors. According to the teaching of the above reference, the compounds are produced by the catalytic partial hydrogenation of the aromatic diamines on which these anilines are based. Unfortunately, this process is attended by the disadvantage that asymmetrical hydrogenation of the diaminodiphenyl alkanes cannot be carried out selectively, and, therefore, the yield of the partially-hydrogenated diamines in question amounts, at most, to only slightly more than 50% of the theoretical, as can be seen from the Examples of the patent.

Since the primary aminocyclohexyl methyl anilines are not only valuable intermediate products for the applications already mentioned, but are also particularly interesting chain-extending agents, having amino groups of graduated reactivity for use in polyurethane chemistry. The object of the present invention, then, is to provide new compounds of the type in question, whose amino groups show a higher difference in reactivity by virtue of the additional substitution on the aromatic ring, and which can be produced with greater degrees of selectivity by virtue of the asymmetrical substitution.

According to the invention, this object is achieved by the provision of the diamines or diamine mixtures according to the invention and by the process suitable for their production.

DESCRIPTION OF THE INVENTION

The present invention relates to diamines, which are optionally present as isomer mixtures, and which may optionally be present with up to 35%, by weight, based on the mixture as a whole, of the corresponding perhydrogenated diamines and/or optionally in admixture with up to 10%, by weight, based on the mixture as a whole, of the corresponding unhydrogenated aromatic diamines, which correspond to the general formula

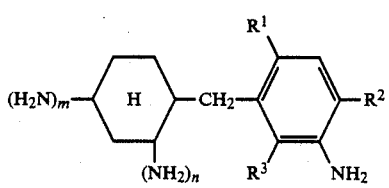

wherein
$R^1$, $R^2$ and $R^3$ may be the same or different and represent hydrogen or straight- or branched-chain $C_1$–$C_{12}$ alkyl groups, provided that two of the radicals $R^1$, $R^2$ and $R^3$ represent hydrogen, and
m and n each represent 0 or 1, provided that the sum of m+n=1; where m or n=0, the free valence is saturated by hydrogen.

The present invention also relates to a process for producing these diamines or diamine mixtures which is characterized in that the aromatic diamines, optionally present as isomer mixtures, and corresponding to the formula:

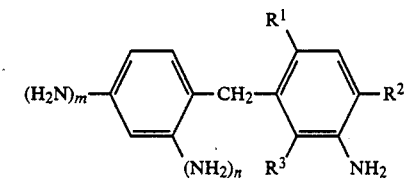

are catalytically-hydrogenated with the addition of 3 moles of hydrogen per mole of diamine, or dinitro compounds, optionally present in the form of an isomer mixture, and corresponding to the formula:

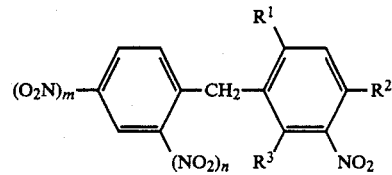

are catalytically-hydrogenated with the reaction of 9 moles of hydrogen per mole of dinitro compound. In the two above formulae, $R^1$, $R^2$, $R^3$, m and n are as already defined.

The aromatic diamines corresponding to the above general formula, which are suitable for use as starting material in the process according to the invention, may be both pure substances and also isomer mixtures. Diamines corresponding to the above formula in which one of the radicals $R^1$, $R^2$ or $R^3$ represents a $C_1$–$C_4$ alkyl radical, more particularly a methyl radical, and the other two radicals represent hydrogen, are particularly suitable.

Examples of aromatic diamines suitable for use as starting material in accordance with the invention include:

(a) the diamines described in European Pat. No. 46,556 (where they are used as starting material for production of the corresponding diisocyanates), which are optionally present in admixture with up to 40%, by weight, based on the mixture as a whole, of diamines corresponding to the formula:

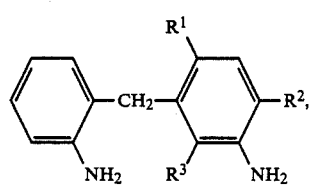

and optionally with up to 40%, by weight, based on the mixture as a whole, of other $C_2$–$C_{12}$-alkyl-substituted diaminodiphenyl methane isomers, corresponding to the formula:

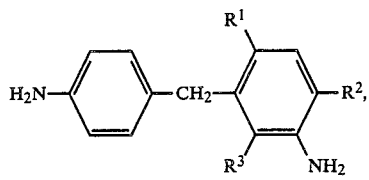

wherein the radicals, $R^1$, $R^2$ and $R^3$, in the above formulae are the same or different and representing hydrogen or a $C_2$–$C_{12}$-alkyl group, with the proviso that, in both formulae, two of the radicals $R^1$, $R^2$ and $R^3$ represent hydrogen and one of the radicals $R^1$, $R^2$ or $R^3$ represents an alkyl group of the above-mentioned type;

(b) the diamines or diamine mixtures corresponding to the above diamines, or diamine mixtures which are described in Eurpoean Pat. No. 24,665 (where they are used as starting material for production of the corresponding polyisocyanates), and which also correspond to the last of the above formulae, except that two of the radicals, $R^1$, $R^2$ and $R^3$, represent hydrogen and one of the radicals represents a methyl group.

Preferred starting materials for use in the process according to the invention include 3,4'-diamino-4-methyl diphenyl methane (corresponding to Example 9b of European Pat. No. 24,665); the mixture of methyl-substituted diaminodiphenyl methane isomers containing this diamine as main component, corresponding to European Pat. No. 24,665; 5,4'-diamino-2-methyl diphenyl methane; 5,2'-diamino-2-methyl diphenyl methane; 3,2'-diamino-4-methyl diphenyl methane; 3,4'-diamino-2-methyl diphenyl methane; 3,2'-diamino-2-methyl diphenyl methane; and mixtures thereof.

Instead of using the aromatic diamines mentioned by way of example as starting materials in the process according to the invention, it is also possible to use the aromatic dinitro compounds corresponding to these diamines and having the above-mentioned formula, in which $R^1$, $R^2$, $R^3$, m and n are as already defined. It is preferred to use those dinitro compounds of the above-mentioned type in which one of the radicals $R^1$, $R^2$ or $R^3$ represents a $C_1$–$C_4$-alkyl group, more particularly a methyl group, and the other two radicals represent hydrogen. The dinitro compounds may also be used in the form of pure substances or in the form of isomer mixtures.

The preferred dinitro compounds containing an alkyl substituent of the above-mentioned type are the preliminary stages of the diamines described in European Pat. No. 24,665 and in European Pat. No. 46,556, and therefore, the foregoing observations on the distribution of isomers in isomer mixtures optionally used in the process according to the invention also apply here. The preferred dinitro compounds are produced by the methods described in the above-mentioned published European patents.

In the practical application of the process according to the invention, the aromatic diamines or dinitro compounds used as starting material are catalytically-hydrogenated with the addition of 3 moles of hydrogen per mole of diamine or with the reaction of 9 moles of hydrogen per mole of dinitro compound. In other words, the hydrogenation reaction is preferably terminated after the consumption of 3 or 9 moles of hydrogen per mole of starting compound. The hydrogenation reaction is carried out at 20° to 300° C. under a pressure of from 20 to 300 bar.

Where dinitro compounds are used as starting materials, it is advisable to carry out the initial hydrogenation of the nitro groups at a temperature in the range from 20° to 150° C., and preferably at a temperature of from 30° to 100° C., under a pressure of from 20 to 150 bar, and preferably under a pressure of from 70 to 140 bar. Thereafter it is preferable to obtain partial hydrogenation of the aromatic hydrocarbon skeleton at a temperature of from 70° to 300° C., and preferably at a temperature of from 120° to 250° C., under a pressure of from 70 to 300 bar and preferably under a pressure of from 120 to 250 bar. Where aromatic diamine compounds of the type mentioned by way of example are used as starting materials in accordance with the invention, hydrogenation is preferably carried out under the latter conditions. As to be seen from NMR-spectroscopic investigations the partially hydrogenated "H6"-diamines consist almost exclusively of diamines whose alkyl substituents are linked to the aromatic ring.

The hydrogenation reaction according to the invention is carried out in the presence of from 0.1 to 10%, preferably from 0.1 to 1%, by weight, based on catalytically active metal on the one hand and diamine or dinitro compound on the other hand, of a hydrogenation catalyst. Suitable catalysts include, for example, elements of the Eighth Sub-Group of the Periodic Table of Elements, or catalytically-active inorganic compounds of these elements, optionally applied in either case to inert supports, such as active carbon, silica gel and, in particular, aluminum oxide. Particularly suitable catalysts are, for example, ruthenium, platinum, rhodium, nickel and/or cobalt catalysts in elemental or chemically-bound form. It is particularly preferred to use ruthenium or catalytically-active ruthenium compounds. Examples of suitable ruthenium compounds include ruthenium dioxide, ruthenium tetraoxide, barium perruthenite, sodium, potassium, silver, calcium or magnesium ruthenate, sodium perruthenate, ruthenium pentafluoride, ruthenium tetrafluoride hydrate and ruthenium trichloride.

Where supports are used for the catalysts, the metal content of the supported catalyst generally amounts to between 1 and 10%, preferably to between 1 and 5%, by weight. The type of catalyst used and the quantity in which it is used are, of course, not crucial to the invention because the hydrogenation reaction is carried out by methods known in the art.

It is often best to carry out the hydrogenation reaction according to the invention in the presence of ammonia because ammonia suppresses undesirable deamination reactions and the formation of secondary amines as by-products. If ammonia is used, it is employed in quantities of from 0.1 to 30%, by weight, preferably from 5 to 10%, by weight, based on the starting materials to be hydrogenated.

The process according to the invention may be carried out in the absence of solvents or in the presence of inert solvents. In general, low-melting or liquid diamines are hydrogenated as such, whereas high-melting diamines and dinitro compounds are hydrogenated in dissolved form. Suitable solvents include low-boiling organic compounds which are inert under the reaction conditions, preferably alcohols, such as methanol, ethanol, n-propanol, i-propanol; or ethers, such as, for example, dioxane, tetrahydrofuran or diethyl ether; or hydrocarbons, such as cyclohexane.

The process according to the invention is carried out continuously in a reaction tube, in a cascade of pressure vessels or, preferably, in batches in a stirrer-equipped autoclave which is charged with catalyst, with the substance to be hydrogenated, and optionally with solvent, repeatedly purged with inert gas, with ammonia optionally introduced. Thereafter, hydrogen is introduced under pressure, the mixture is heated to the reaction temperature and then hydrogenated until the theoretically-necessary quantity of hydrogen has been absorbed. After cooling of the reaction mixture and separation of the catalyst, the end product may be worked-up by distillation.

As already mentioned, the major advantage of the process according to the invention over the process described in U.S. Pat. No. 2,511,028 lies in the fact that the partial hydrogenation reaction takes place with increased selectivity, resulting in considerably higher yields of aminocyclohexyl methyl anilines corresponding to the starting materials used.

In general, less than 35%, preferably less than 20%, by weight, of perhydrogenated cycloaliphatic diamines and less than 10%, preferably less than 5%, by weight, of unhydrogenated aromatic diamines are present in the reaction mixtures accumulating in the process according to the invention, based on the total quantity of diamines. The main product generally consists of the required, partially hydrogenated cycloaliphatic-aromatic diamine. The diamines according to the invention are generally isomer mixtures and largely correspond in position isomerism to the starting materials used. In addition, stereoisomeric compounds are also generally present in the reaction mixture.

In general, separation into the individual position and stereoisomers is not necessary for use of the end products according to the invention on a commercial scale. Particularly in the preferred application of the end products according to the invention as chain-extending agents of graduated reactivity in polyurethane chemistry, it is not the position or stereoisomerism which counts, but solely the fact that the main component of the diamine mixture should consist of partially-hydrogenated aminocyclohexyl methyl anilines.

The invention is further illustrated by the following examples in which all the percentages quoted represent percentages by weight, unless otherwise indicated.

EXAMPLES

EXAMPLE 1

A 1.3 liter stirrer-equipped autoclave is filled with 500 g (2.36 moles) of the diamine mixture described in Example 8c of European Pat. No. 24,665, which distills at 150° to 200° C. (0.1333 mabar) composed of 34,5% of 3,4′-diamino-4-methyl-diphenylmethane
16.9% of 5,4′-diamino-2-methyl-diphenylmethane
7,2% of 3,4′-diamino-2-methyl-diphenylmethane
15,2% of 3,2′-diamino-4-methyl-diphenylmethane
7,5% of 5,2′-diamino-2-methyl-diphenylmethane
3,2% of 3,2′-diamino-2-methyl-diphenylmethane and
15,5% of other diamino-methyl-diphenylmethanes and 50 g of a standard commercial catalyst according to Table 1. After repeated purging with nitrogen and hydrogen, 50 g of ammonia are introduced, the reaction mixture is heated to an elevated temperature and then hydrogenated, with stirring at 200 bar, until 7.1 moles of hydrogen have been taken up. After cooling to room temperature, the autoclave is vented, the crude product is dissolved in methanol, and the catalyst is separated-off by filtration.

The catalyst is repeatedly washed with methanol and re-used. The crude product is freed from relatively high molecular weight substances by distillation and analyzed by gas chromatography. In all, 6 tests, 1(a)–1(f) are carried out using the above-described method under different conditions. The results obtained are set out in Table 1.

TABLE 1

| No. | Catalyst | Reaction temp. (°C.) | Hydrogenation time (h) | Monoamines | Yield (% of the theoretical) | | | distillation residue |
|---|---|---|---|---|---|---|---|---|
| | | | | | $H_{12}^{(1)}$ | $H_6^{(2)}$ | $H_0^{(3)}$ | |
| 1(a) | Ru (5% on Al$_2$O$_3$) | 150 | 2.25 | <0.1 | 6.3 | 73.0 | 20.5 | 0.2 |
| 1(b) | " | 140 | 3.75 | 0.3 | 34.2 | 65.1 | <0.1 | 0.5 |
| 1(c) | " | 130 | 11 | 0.8 | 28.6 | 70.2 | <0.1 | 0.4 |
| 1(d) | " | 125 | 22 | 0.6 | 24.1 | 73.5 | 1.4 | 0.4 |
| 1(e) | Raney-Ni | 240 | 12 | 0.6 | 3.1 | 35.0 | 55.7 | 5.7 |

TABLE 1-continued

| No. | Catalyst | Reaction temp. (°C.) | Hydrogenation time (h) | Monoamines | Yield (% of the theoretical) | | | distillation residue |
|---|---|---|---|---|---|---|---|---|
| | | | | | $H_{12}^{(1)}$ | $H_6^{(2)}$ | $H_0^{(3)}$ | |
| 1(f) | " | 250 | 13.5 | 3.6 | 28.0 | 25.1 | 40.0 | 3.3 |

Key to Table 1:

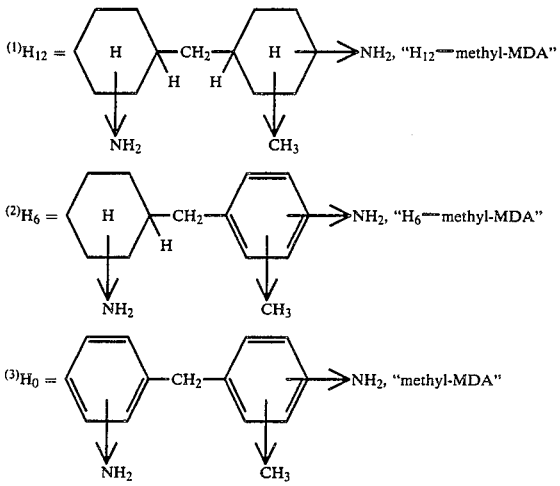

EXAMPLE 2

250 g (1.18 moles) of the main fraction—boiling at 198° to 205° C./0.1 mbar—of the polyamine mixture according to Example 7c of European Pat. No. 24,665 whose isomer distribution corresponds to the isomer distribution of the diamine starting material of said example 7 and 25 g of a supported Ru catalyst (5% Ru on $Al_2O_3$) are initially introduced into a 0.7 stirrer-equipped autoclave, followed by the addition of 25 g of ammonia, after repeated purging with nitrogen and hydrogen. After heating-with-stirring to 125° C., the mixture is reacted under 200 bar pressure for 12.5 hours, by which time 3.5 moles of hydrogen have been taken up. After the catalyst has been separated off, the crude product is distilled. According to analysis by gas chromatography, the main fraction which distills at 110° to 131° C./0.1 mbar contained 211,5 g (82,2% of the theoretical) of 1-(1H-aminocyclohexyl-methyl)3-amino-4-methyl-benzene composed of 2,4% of 2,2'-diamino-4-methyl-diphenylmethane
31,3% of 3,2'-diamino-4-methyl-diphenylmethane
64,5% of 3,4'-diamino-4-methyl-diphenylmethane and
1,8% of undefined diamines, 26,6 g (11.2% of the theoretical) of diamino-4-methyl dicyclohexyl methane isomers and
8.5 g (3.8% of the theoretical) of unhydrogenated, aromatic diamine.
The distillation residue weighed 6.0 g (2.6% of the theoretical).

EXAMPLE 3

In accordance with European Pat. No. 24,665, a diamine mixture of the following composition is prepared by dinitrating a condensate of 2-methyl benzyl chloride and benzene and subsequently hydrogenating the dinitro compound obtained:

1% of 6,2'-diamino-2-methyl-diphenylmethane;
14,5% of an isomer mixture of 3,2'-, 5,2'- and 6,3'-diamino-2-methyldiphenylmethane;
0,9% of 6,3'-diamino-2-methyl-diphenylmethane;
7,9% of an isomer mixture of 4,2'- and 6,4'-diamino-2-methyl-diphenylmethane;
75% of an isomer mixture more than 80% of which consist of 3,4'- and
5,4'-diamino-2-methyl-diphenylmethane and
0,7% undefined polyamines.

250 g (1.18 moles) of this diamine mixture are hydrogenated for 22 hours at 125° C./200 bar on a supported Ru catalyst in the same way as in Example 2.
According to analysis by gas chromatography, the main fraction which boils at 100° to 146° C./0.1 mbar consisted of 41.0 g (15.5% of the theoretical) of the perhydrogenated diamine corresponding to the starting diamine, 190.9 g (74.2% of the theoretical) of (1H-aminocyclohexylmethyl)-2-methyl anilines corresponding to the starting diamine and 23.8 g (9.5% of the theoretical) of unchanged starting material. The distillation residue weighed 2.1 g (0.8% of the theoretical).

EXAMPLE 4

Using the same procedure as in Example 2, 250 g (1.18 mole) of 5,4'-diamino-2-methyl diphenyl methane are hydrogenated in a 0.7 liter stirrer-equipped autoclave for 11.5 hours at 125° C./200 bar in the presence of 25 g of supported Ru catalyst (5% of Ru on $Al_2O_3$) and 25 g of ammonia.
The yields obtained are:
58.4 g (22.1% of the theoretical) of 5,4'-diamino-2-methyl dicyclohexyl methane,
191.9 g (74.6 % of the theoretical) of 4-[5-amino-2-methylbenzyl]-cyclohexylamine, and
6.0 g (2.4% of the theoretical) of 5,4'-diamino-2-methyl diphenyl methane.
2.1 g (0.8% of the theoretical) were isolated as distillation residue.

EXAMPLE 5

A 0.7 liter stirrer-equipped autoclave is filled with 250 g (1.18 mole) of 3,4'-diamino-4-methyl diphenyl methane and 25 g of $Ru/Al_2O_3$ (Ru-content 5% by weight). After repeated purging with nitrogen and hydrogen, 25 g of liquid ammonia are introduced by a Lewa pump, the autoclave is heated with stirring to 125° C. and the reaction mixture hydrogenated under a pressure of 200 bar until, after 16 hours, approximately 3.5 moles of hydrogen have been absorbed. The stirrer is then switched off, the contents of the autoclave allowed to cool, the autoclave vented and the product taken up in methanol. The catalyst is then filtered off, followed by washing with methanol. The methanol solutions are combined and, after evaporation of the solvent and flash distillation at 0.1 bar/100°–150° C., 254 g of a mixture are obtained which, according to analysis by gas chromatography, consists of 219.5 g (85.3% of the theoretical) of 4-[3-amino-4-methyl-benzyl]-cyclohexyl amine and 34.0 g (12.9% of the theoretical) of 3,4'-diamino-4-methyl dicyclohexyl methane. Another 150 g of 4-[3-amino-4-methylbenzyl]cyclohexyl amine were isolated by additional distillation through a Vigreux column at 145°–146° C./0.1 mbar.

$C_{14}H_{22}N_2$ end product: Calculated: C 77.06, H 10.10, N 12.84; Observed: C 76.6, H 10.1, N 12.8; (all figures in %).

EXAMPLE 6

A 0.7 liter stirrer-equipped autoclave is filled with 100 g (0.368 mole) of 3,4'-dinitro-4-methyl diphenyl methane, 100 g of isopropanol and 5 g of a standard commercial ruthenium catalyst (5%, by weight, of Ru on $Al_2O_3$), the autoclave heated with stirring to 90° C. and the mixture hydrogenated under a pressure of 100 to 130 bar until 3,3 moles of hydrogen have been absorbed. Thereafter, the temperature is increased to 140° C. and the hydrogen pressure to 200 bar, after which the reaction mixture is stirred for 2 hours at the same temperature when the pressure remains constant, followed by cooling and venting of the autoclave. The catalyst is filtered off, washed with isopropanol and the mother liquor combined with the washing solution. Removal of the solvent by distillation leaves 80.2 g of a mixture which, according to analysis by gas chromatography, consists of 0.4 g (0.5% of the theoretical) of undefined monomers, 8.7 g (2.4% of the theoretical) of 3,4'-diamino-4-methyl dicyclohexyl methane, 64.0 g (79.9% of the theoretical) of 4-[3-amino-4-methylbenzyl]cyclohexyl amine and 7.1 g of unreacted starting compound. Flash distillation at 120°–180° C./0.1 mbar leaves 61.1 g of distillate of which 0.5% by weight consists of 3,4'-diamino-4-methyl dicyclohexyl methane, 82.7% by weight of 4-[3-amino-4-methylbenzyl]-cyclohexyl amine and 7% by weight of 3,4'-diamino-4-methyl diphenyl methane. The distillation sump weighs 12.5 g.

EXAMPLE 7

(Comparison Example)

A 1.3 liter stirrer-equipped autoclave is filled with 721.7 g (3.65 moles) of 4,4'-diaminodiphenyl methane and 72.2 g of ruthenium catalyst (5% of Ru on $Al_2O_3$) and then purged repeatedly with nitrogen and hydrogen, followed by the introduction of 72.2 g of ammonia. The mixture is then heated with intensive stirring to 125° C. and hydrogenated under pressure of 200 bar until, after about 10 hours, 10.95 moles of hydrogen have been absorbed. The autoclave is then left to cool down, vented and its contents taken up in methanol. The catalyst is filtered off and washed, and the crude product subjected to fractional distillation, 332.6 g distilling over at 120°–135° C./0.1 mbar (fraction 1) and 380.6 g at 135°–150° C./0.1 mbar (fraction 2), whereas 20.6 g remain in the sump as distillation residue. According to analysis by gas chromatography, 72.4% of fraction 1 consists of 4,4'-diaminodicyclohexyl methane and 25.5% of 4-[4-aminobenzyl]-cyclohexylamine and 9.0% of fraction 2 of 4,4'-diaminodicyclohexyl methane and 86.3% of 4-[4-aminobenzyl]-cyclohexylamine, so that the total yield of the required partially hydrogenated diamine amounts to 55.6% of the theoretical.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

EXAMPLE 8

A 0,7 liter stirrer-equipped autoclave is filled with 25 g of $Ru/Al_2O_3$ (Ru-content 5% by weight) and 250 g (1,106 mol) of a diamine mixture prepared according to published European patent application No. 46556 (example 5) composed of 1,9% of a mixture of 2,2'-diamino-4- and 2,2'-diamino-5-ethyldiphenylmethane;

11,1% of 4,2'-diamino-2-ethyl-diphenylmethane;

20,1% of a mixture of 3,2'-diamino-2-, 3,2'-diamino-4- and 3,2'-diamino-6-ethyl-diphenylmethane;

66,1% of a mixture more of 80% of which consist of 3,4'-diamino-2-, 3,4'-diamino-4- and 3,4'-diamino-6-ethyl-diphenylmethane and which still contains up to 20% of other diamino-ethyl-diphenylmethane isomers, and 0,8% of unknown triamines.

The mixture is hydrogenated at 130° C./200 bar until 3,3 moles of hydrogen are absorbed. After working up of the reaction mixture 225 g of a diamine mixture are obtained as distillate composed of 79,4% of 1H-aminoethylbenzyl-cyclohexylamine isomers, whose composition corresponds to the composition of the starting material, 12,5% of perhydrogenated and 5,7% of unhydrogenated starting material. The remaining portion of the distillate consist of unidentified monoamines.

What is claimed is:

1. Diamines corresponding to the formula

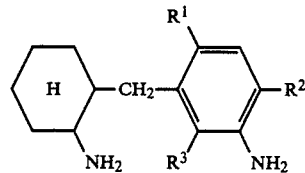

wherein
$R^1$, $R^2$ and $R^3$ may be the same or different and represent hydrogen or a $C_1$–$C_4$ alkyl group, provided that two of the radicals,
$R^1$, $R^2$ and $R^3$ represent hydrogen.

2. Diamines according to claim 1 characterized in that said diamines are in the form of isomeric mixtures.

3. Diamines according to claims 1 or 2, characterized in that
$R^1$ represents a $C_1$–$C_4$ alkyl radical, and
$R^2$ and $R^3$ represents hydrogen.

4. Diamines according to claim 3, characterized in that $R^1$ represents a methyl radical.

5. Diamines according to claims 1 or 2, characterized in that
$R^2$ represents a $C_1$–$C_4$ alkyl radical, and
$R^1$ and $R^3$ represent hydrogen.

6. Diamines according to claim 5, characterized in that $R^2$ represents a methyl radical.

7. Diamines according to claims 1 or 2, characterized in that
$R^3$ represents a $C_1$–$C_4$ alkyl radical, and
$R^1$ and $R^2$ represent hydrogen.

8. Diamines according to claim 7, characterized in that $R^3$ represents a methyl radical.

* * * * *